United States Patent [19]

Fornell

[11] 4,248,046
[45] Feb. 3, 1981

[54] VENT ACCUMULATOR FOR HYDRAULIC INTEGRATOR

[75] Inventor: Robert M. Fornell, Tulsa, Okla.

[73] Assignee: Unit Rig & Equipment Co., Tulsa, Okla.

[21] Appl. No.: 32,138

[22] Filed: Apr. 23, 1979

[51] Int. Cl.³ .................. F01B 7/00; F15B 21/04; F01B 31/12
[52] U.S. Cl. .................. 60/567; 60/534; 60/581; 92/78; 92/86; 92/152; 177/209
[58] Field of Search .................. 92/151, 152, 78, 86; 73/820, 825, 141 R; 177/208, 209; 60/567, 534, 581

[56] References Cited

U.S. PATENT DOCUMENTS

| | | | |
|---|---|---|---|
| 1,031,528 | 7/1912 | Cole | 92/151 |
| 2,093,141 | 9/1937 | Sonsalla | 177/209 |
| 2,125,483 | 8/1938 | Blanchord | 92/151 |
| 2,981,234 | 4/1961 | Appleton | 92/151 |
| 3,430,539 | 3/1969 | Freeman | 92/151 |
| 3,601,011 | 8/1971 | Arnes | 92/78 |

*Primary Examiner*—Paul E. Maslousky
*Attorney, Agent, or Firm*—William S. Dorman

[57] ABSTRACT

A vent accumulator for a hydraulic integrator of the type having at least three pistons arranged in end-to-end relationship within an elongated housing. Each piston is adapted to move under hydraulic pressure in a direction away from one longitudinal end of the housing towards the opposite longitudinal end. Each of the pistons, except for the last piston adjacent the opposite end of the housing, is provided with a piston rod operatively connected to the piston next adjacent towards one end of the housing. Each piston is defined as having a first side directed towards one end of the housing and a second side directed towards the opposite end of the housing. Each of the pistons, except for the last two pistons in line, is provided with means for receiving hydraulic fluid under pressure from a load cell on its first side and an air vent communicates on it second side. The next-to-last piston, adjacent the opposite end of the housing, has means for receiving hydraulic fluid under pressure on its firstside, with the other side of the next-to-last piston being mechanically connected to the last piston. The last piston exerts its pressure on a body of hydraulic fluid which is located on its second side, whereby the pressure on this body of fluid represents the total of the pressures exerted on the remaining pistons by the load cells which are connected thereto. An air vent communicates with the last piston on its first side. The improvement over the prior art is the vent accumulator which is formed by an elongated cylindrical hollow closed chamber and a conduit connecting each of the air vents of the hydraulic integrator to the vent accumulator.

5 Claims, 2 Drawing Figures

VENT ACCUMULATOR FOR HYDRAULIC INTEGRATOR

BACKGROUND OF THE INVENTION

1. Field of the Invention

The present invention relates to a vent accumulator and, more particularly, to one which is designed to provide an air reservoir for a hydraulic integrator.

2. Description of the Prior Art

There are a large number of mining operations which use large off-the-road vehicles to haul minerals or coal from the mine to a transportation point. A record of the tonage of material removed from the mine is kept by the operators of the mine, this tonage being obtained by weighing the vehicles when loaded and substracting the known empty weight of the vehicle therefrom. These vehicles are usually weighed upon transportable hydraulic scales which are either placed upon a level roadway or are placed within a shallow pit. In the operation of these scales, air is drawn in and expelled from a hydraulic integrator located within the scales. Dirt and other foreign matter are often drawn into the hydraulic integrator thereby fouling the operation thereof. Further, when the hydraulic scales are placed within a shallow pit, water is sometimes permitted to be drawn into the hydraulic integrator. If the temperature drops below freezing, the water which may be within the hydraulic integrator freezes and thereby renders the hydraulic scales inoperable.

In the past, numerous filtration devices have been used on the hydraulic integrator within the hydraulic scales. However, none of these prior art devices has been designed to provide a closed air reservoir system for a hydraulic integrator thereby preventing foreign matter from being drawn into the hydraulic integrator.

SUMMARY OF THE INVENTION

The present invention generally provides an air reservoir or vent accumulator for a hydraulic integrator. The vent accumulator is designed to prevent foreign matter from being drawn into the hydraulic integrator thereby preventing the fouling of the operation thereof.

A hydraulic integrator is provided having at least three pistons arranged in end-to-end relationship within an elongated housing. Each piston is adapted to move under hydraulic pressure in a direction away from one longitudinal end (for example, the left end) of the housing towards the opposite longitudinal end (for example, the right end). Each of the pistons, except for the last piston adjacent the right end of the housing, is provided with a piston rod operatively connected to the piston next towards the left. Each of the pistons, except for the last two pistons in line, is provided with means for receiving hydraulic fluid under pressure from a load cell on its left first side and an air vent communicates on the right side. The next-to-last piston, adjacent the right end of the housing, has means for receiving hydraulic fluid under pressure on its left side, with its other side being mechanically connected to the last piston. The last piston exerts its pressure on a body of hydraulic fluid which is located on its right side, whereby the pressure on this body of fluid represents the total of the pressures exerted on the remaining pistons by the load cells which are connected thereto. An air vent communicates with the last piston on its left side. The improvement over the prior art comprises a vent accumulator which formed by an elongated cylindrical hollow closed chamber and a conduit connecting each of the air vents of the hydraulic integrator to the vent accumulator.

DETAILED DESCRIPTION OF THE PREFERRED EMBODIMENTS

Figure 1:
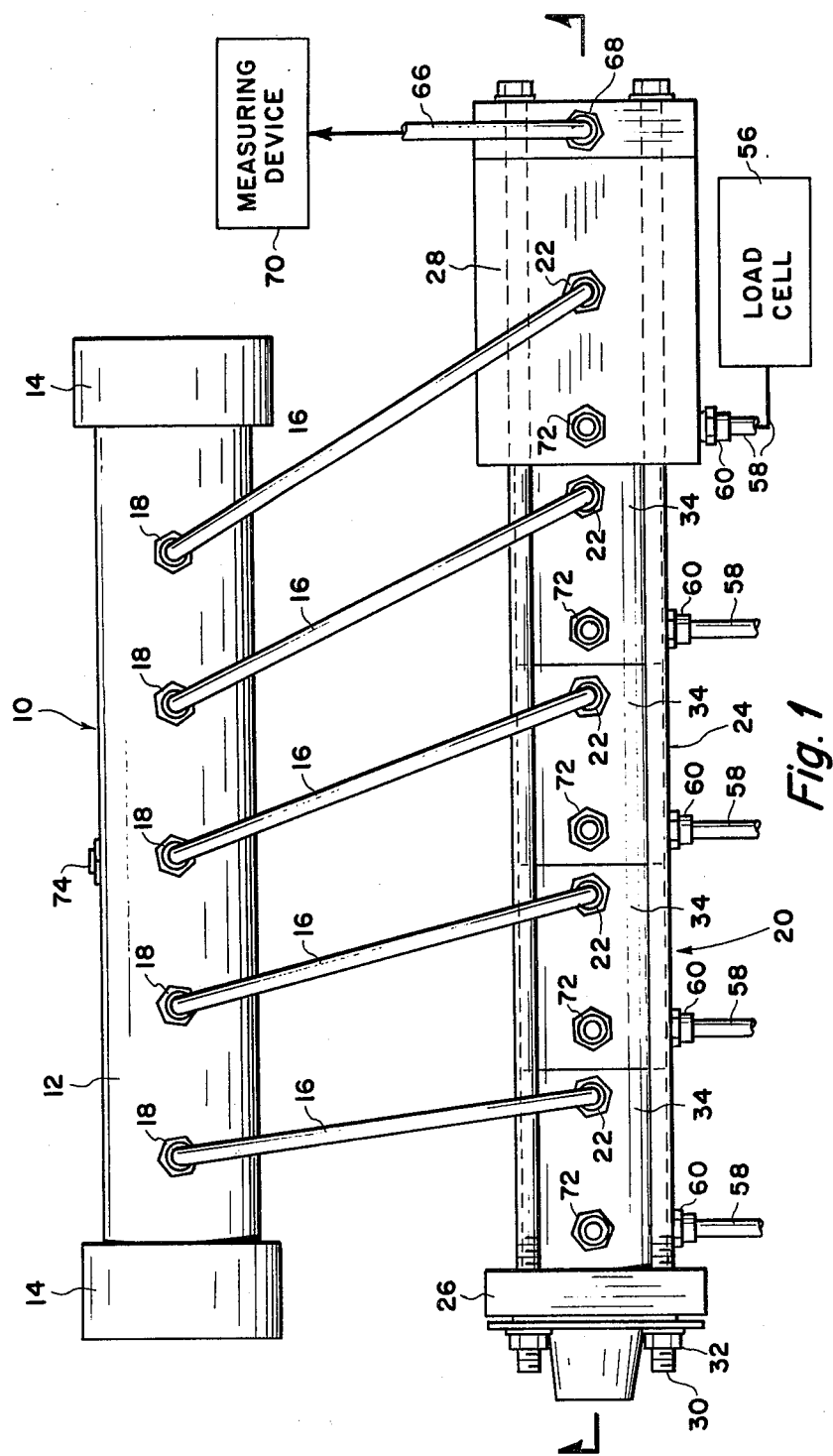
FIG. 1 is a top plan view of a vent accumulator embodying the present invention, with a hydraulic integrator operatively connected thereto.

Referring to the drawings in detail, reference character 10 generally indicates a vent accumulator particularly designed to provide an air reservoir for a hydraulic integrator. As shown in FIG. 1, the vent accumulator 10 is substantially cylindrical in shape and is formed by a hollow cylindrical member 12 and two oppositely spaced end caps 14 attached thereto. A plurality of conduits 16 are attached to the accumulator 10 by means of connectors 18 which are longitudinally spaced along the cylindrical member 12. The conduits 16 extend from the vent accumulator to a hydraulic integrator 20 and are attached thereto by means of longitudinally spaced connectors 22.

Figure 2:
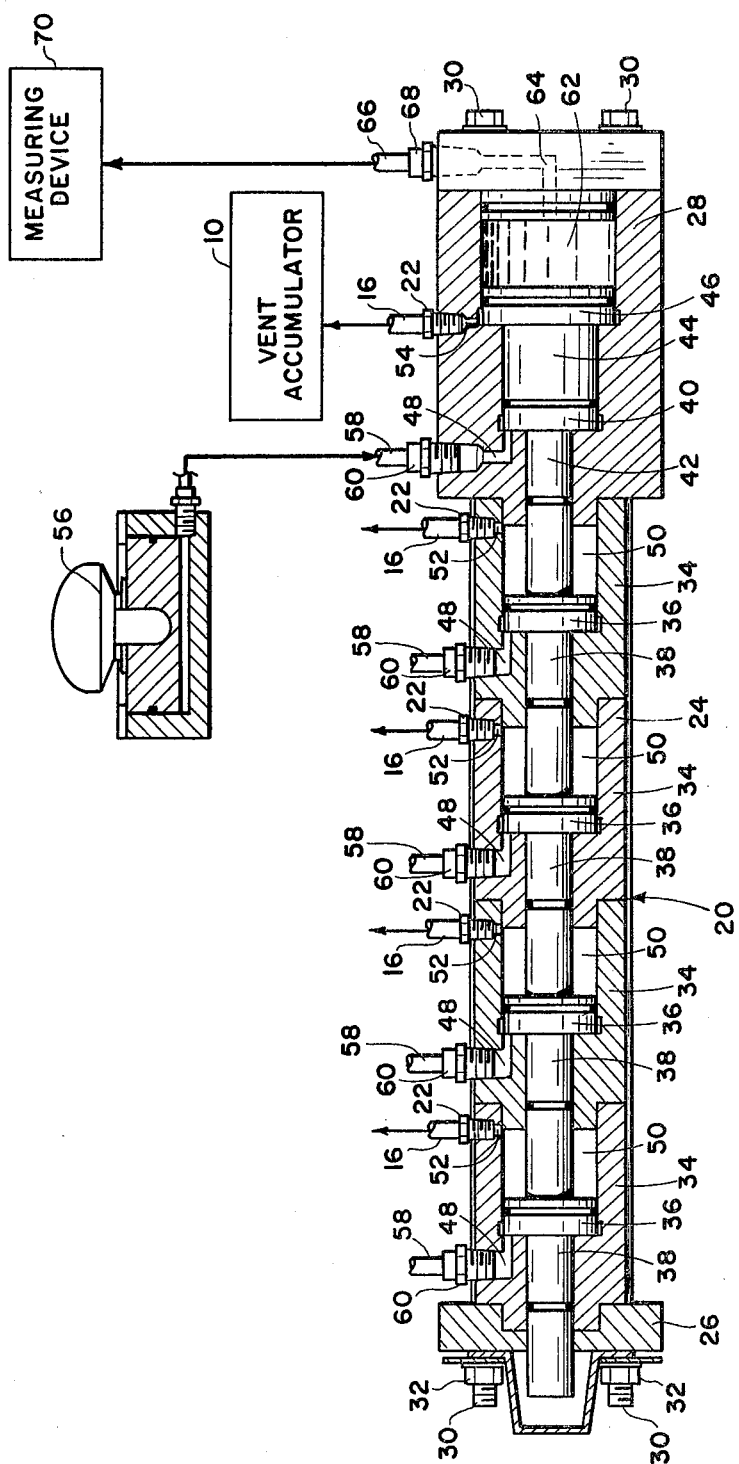
FIG. 2 is a longitudinal sectional view of the hydraulic integrator taken along section line 2—2 of FIG. 1.

As shown in FIG. 2, the hydraulic integrator 20 is composed of an elongated housing 24 with an end cap 26 attached to the left end thereof and a larger housing 28 attached to the right end thereof by means of a plurality of peripherally spaced elongated bolts 30, with nuts 32 attached thereto, which pass longitudinally from one end of the hydraulic integrator 20 to the other. The elongated housing 24 is formed by a plurality of individual housings 32 which are retained in series by the elongated bolts 30 and nuts 32. A piston 36, with a shaft 38 attached thereto, is spaced within each of the housings 34. A piston 40, with a shaft 42 attached thereto, is mechanically connected to a shaft 44, of the same diameter as the piston 40, which is attached to a larger end piston 46. The pistons 40 and 46 are received within the larger housing 28. The pistons 36, 40, and the end piston 46 are in axial alignment and in serial contact through their associated piston rods each with another within the hydraulic integrator 20. On the left side of the pistons 36 and 40 is hydraulic fluid or oil which is supplied through hydraulic ports 48. On the right side of each piston 36 is an air chamber 50 with an air port 52 opening therein. An air port 54, spaced within the larger housing 28, opens adjacent the upper side edge of the end piston 46. A plurality of load cells 56, such as the type used within a hydraulic scale (not shown) are connected to the hydraulic integrator 20 by means of conduits 58 (one for each load cell) and longitudinally spaced connectors 60 which open into the hydraulic ports 48. For sake of clarity, the conduits 58 and the connectors 60, as illustrated in FIG. 2, are rotated 90° from their true positions shown in FIG. 1, On the right side of the end piston 46 is body of hydraulic fluid 62, whereby the pressure exerted on this body of hydraulic fluid 62 represents the total of the pressures exerted on the pistons 36 and the piston 40 by the load cells 56 which are attached thereto. A hydraulic port 64, which opens into the body of hydraulic fluid 62, is connected to an output conduit 66 by means of the connector 68. The output conduit 66 is connected to a measuring device 70, such as the type used within a hydraulic scale, which measures the total of the hydraulic pressure from all of the load cells 56. For sake of clarity, the output conduit 66 and connector 68, as illustrated in FIG. 2, are rotated 90° from their true positions shown in FIG. 1.

When hydraulic pressure is applied to the hydraulic integrator 20 from the load cells 56, the pistons 36, 40 and 46 move longitudinally from one end of the elongated housing 24 towards the other thereby expelling the air from the air chambers 50 through the ports 52 and drawing in air through the port 54 adjacent to the end piston 46. When the hydraulic pressure is removed from the hydraulic integrator, the pistons 36, 40 and 46 return to the rest position thereby drawing in air through the ports 52 adjacent the pistons 36 and expelling air through the port 54 adjacent the end piston 46. Under the prior art, the air ports 52 and 54 were open to the atmosphere where permitted dust and water to be drawn into the hydraulic integrator 20. For example, when a hydraulic integrator 20 was used within a hydraulic scale (not shown) of the type used to weigh large trucks, the scale would be placed within a shallow pit where dust and water were permitted to be drawn into the hydraulic integrator 20 thereby fouling the operation thereof.

The vent accumulator 10 provides a novel means for proviair reservoir for a hydraulic integrator 20 which prevents foreign matter from being drawn into the hydraulic integrator 20. The vent accumulator 10 is connected to the air ports 52 and 54 by means of the connectors 22 and conduits 16. When pressures from the load cells 56 are applied to the hydraulic integrator 20, the pistons 36, 40 and 46 move longitudinally from one end of the elongated housing towards the other, thereby expelling air from the air chambers 50 into the vent accumulator 10 and drawing in air from the vent accumulator 10 through the port 54 which is adjacent the end piston 46. Air which is expelled from the hydraulic integrator 20 into the vent accumulator 10 is, in turn, drawn in when the hydraulic pressure is removed from the hydraulic integrator 20 thereby preventing any dirt or foreign matter from entering therein.

It should be noted that in operation, the pistons 36, 40 and 46 do not move more than a very short distance in either direction, therefore, the volume of air which is displaced is small as compared to the volume of air within the vent accumulator 10. For example, if the pistons 36 and 40 are two inches in diameter and the end piston 46 is three inches in diameter and pressure is applied from the load cells 56, the pistons 36, 40 and 46 are displaced approximately ⅛ of an inch. The air which is expelled by the pistons 36, minus the air drawn in by the piston 46, is approximately 0.687 cubic inches. In this example, if the vent accumulator 10 is 18 inches long by 3 inches in diameter, then approximately 127 cubic inches of air would be contained therein. As can be seen, the ratio of air within the vent accumulator 10 to the air expelled from the hydraulic integrator 20 is approximately 185:1, therefore, the air within the vent accumulator 10 is substantially at atmospheric (or constant) pressure at all times.

As shown in FIG. 1, a plurality of vent plugs 72 are longitudinally spaced along the elongated housing 24 of the hydraulic integrator 20. The plugs 72 open into hydraulic ports (not shown), which are substantially the same as the hydraulic ports 48, thereby providing means for the venting or "bleeding" of the hydraulic fluid within the hydraulic integrator 20 if it ever becomes desirable to do so. The vent accumulator 10 is provided with a centrally spaced drain plug 74 which permits the draining of hydraulic fluid from the vent accumulator 10 in the event that hydraulic fluid leaks from around a piston 36, 40 or 46 and is forced into the vent accumulator 10.

In the configuration shown in FIGS. 1 and 2, the hydraulic accumulator is provided with a terminal piston 46 which is described as being of larger diameter than the piston 40; however, in simpler models (not shown) of hydraulic integrators it is possible to employ a terminal piston (not shown) which is of the same diameter as the piston 40 in which case the port 54 can be eliminated because it is unnecessary. Thus the vent accumulator will communicate only with the various ports 48. With regard to vent accumulator itself, this is illustrated as having a plurality of openings represented by the connectors 18 which are longitudinally spaced along the accumulator; however, if desired, a single conduit 16 connecting with a single connector 18 could be provided where this conduit would connect with the various ports 48 through a series of Tee connectors (not shown). Also, the shape of accumulator 10 is not significant providing that it has the volumetric capacity referred to herein.

Whereas, the present invention has been described in particular relation to the drawings attached hereto, it should be understood that other and further modifications of the invention, apart from those shown or suggested therein, may be made within the scope and spirit of this invention.

What is claimed is:

1. A vent accumulator for a hydraulic integrator of the type having at least three pistons arranged in end-to-end relationship within an elongated housing, wherein each piston is adapted to move under hydraulic pressure in a direction away from a first longitudinal end of the housing toward a second and opposite longitudinal end of the housing, wherein the pistons are in axial alignment and in serial contact with each other within the housing, wherein each piston is defined as having a first side directed towards said first longitudinal end of said housing and a second side directed towards said second longitudinal end of the housing, wherein each of the pistons except for said last piston is provided with means for receiving hydraulic fluid under pressure from a load cell on said first side of each said piston, wherein each of said pistons except for the last two pistons is provided with an air vent communicating on said second side of each said piston, wherein the second side of the next-to-last piston is operatively connected to said last piston, and said last piston exerting its pressure on a body of hydraulic fluid located on its second side whereby the pressure exerted on this body of fluid represents the total of the pressures exerted on the remaining pistons by the load cells connected thereto; said vent accumulator being formed by a hollow closed chamber, and a conduit connected from each of the air vents of said integrator to said vent accumulator.

2. A vent accumulator as set forth in claim 1 wherein an air vent communicates with said last piston on its first side and wherein said air vent for said last piston connects with said vent accumulator.

3. A vent accumulator as set forth in claim 2 wherein the volumetric capacity of the hollow closed chamber of the accumulator is considerably in excess of the air displaced by the hydraulic integrator through the various air vents thereof.

4. A vent accumulator as set forth in claim 1 wherein the volumetric capacity of the hollow closed chamber of the accumulator is considerably in excess of the air displaced by the hydraulic integrator through the various air vents thereof.

5. A vent accumulator as set forth in claim 1 and including a centrally spaced opening in said vent accumulator forming a drain plug thereby permitting drainage of hydraulic fluid from said accumulator.

* * * * *